No. 613,984. Patented Nov. 8, 1898.
R. FRISKE & F. KASPAREK.
PLATE GLASS POLISHING MACHINE.
(Application filed Sept. 18, 1897.)
(No Model.) 5 Sheets—Sheet 1.
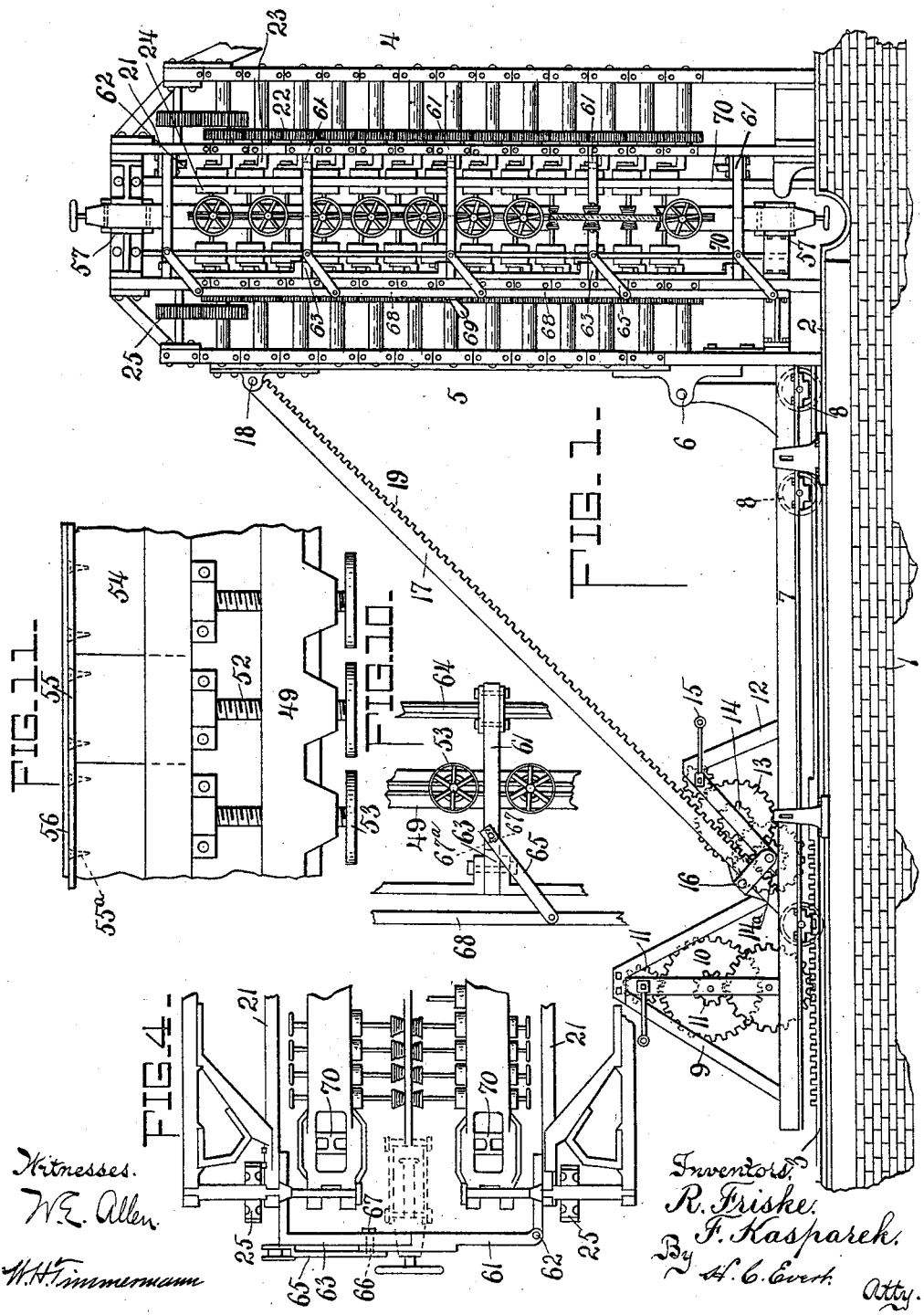

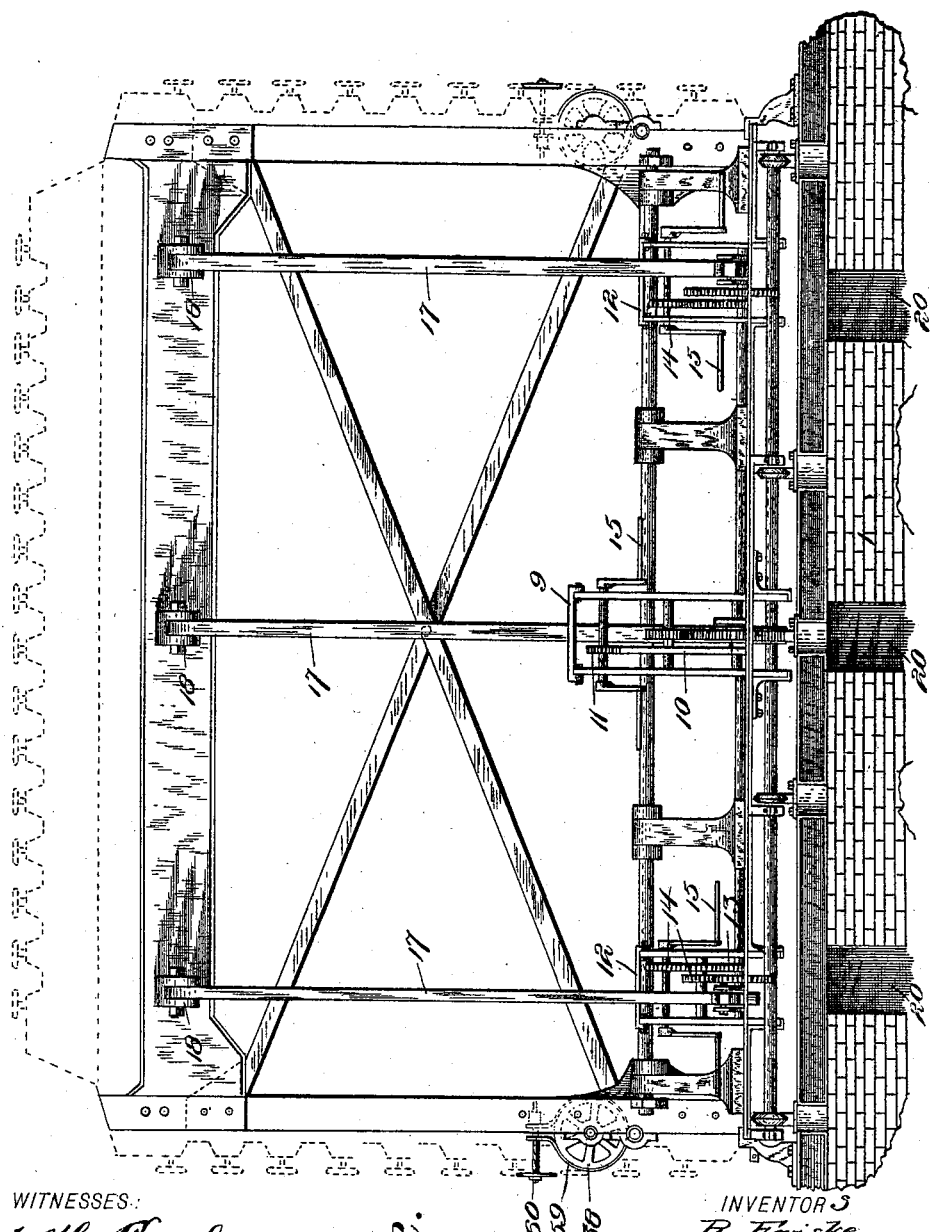

No. 613,984. Patented Nov. 8, 1898.
R. FRISKE & F. KASPAREK.
PLATE GLASS POLISHING MACHINE.
(Application filed Sept. 18, 1897.)
(No Model.) 5 Sheets—Sheet 3.
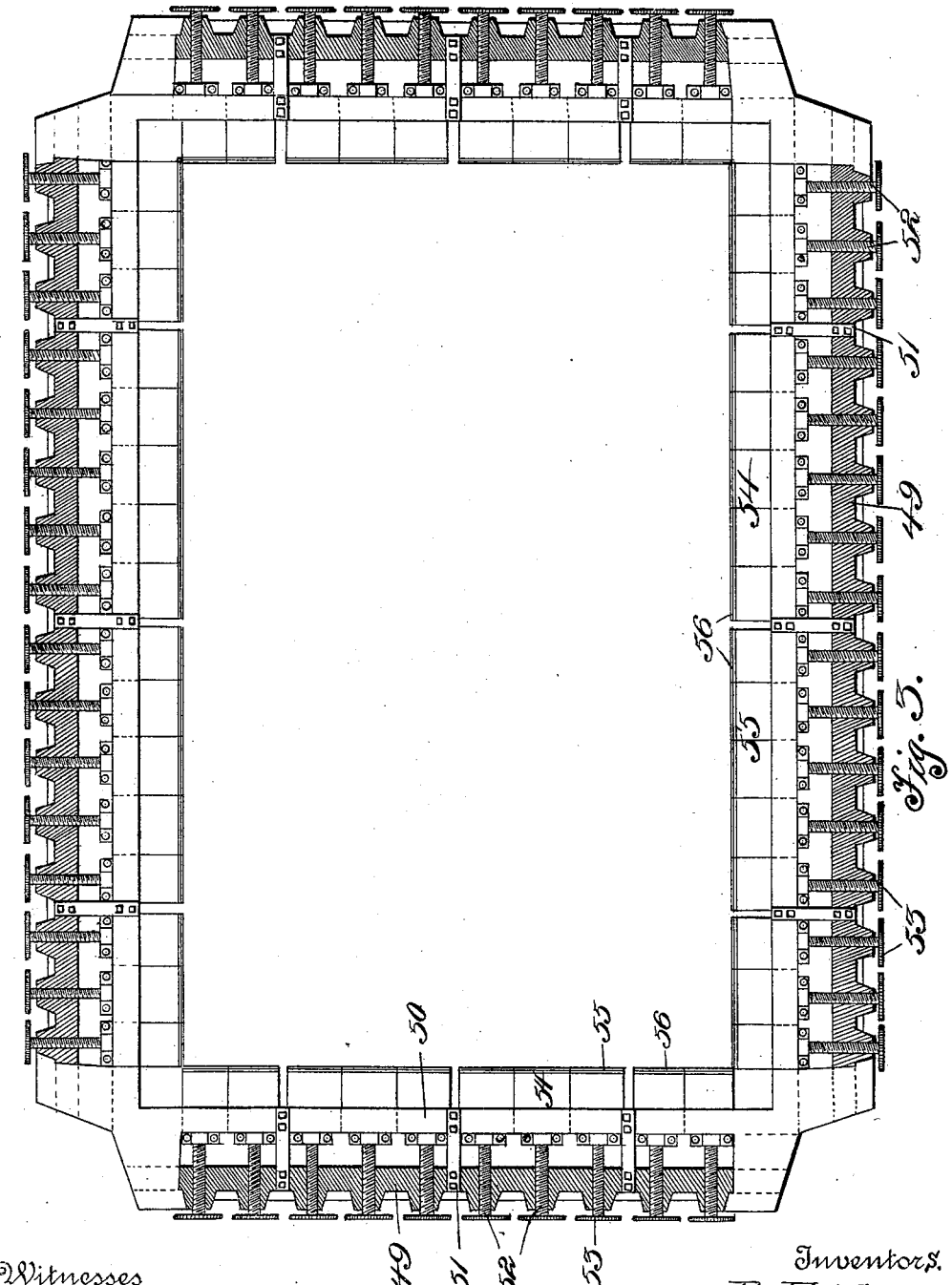

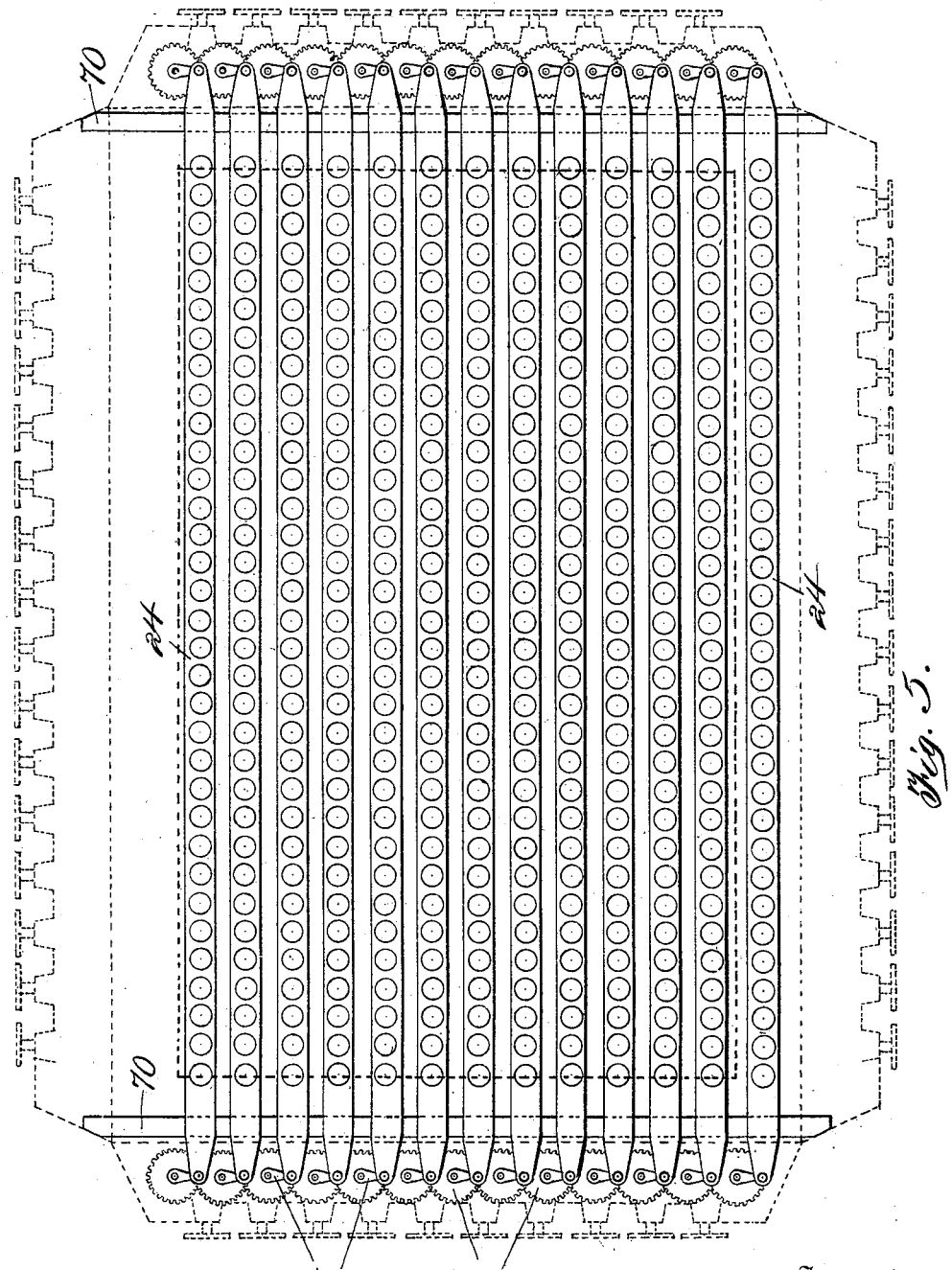

No. 613,984. Patented Nov. 8, 1898.
R. FRISKE & F. KASPAREK.
PLATE GLASS POLISHING MACHINE.
(Application filed Sept. 18, 1897.)
(No Model.) 5 Sheets—Sheet 5.

UNITED STATES PATENT OFFICE.

ROBERT FRISKE AND FRANK KASPAREK, OF IRWIN, PENNSYLVANIA.

PLATE-GLASS-POLISHING MACHINE.

SPECIFICATION forming part of Letters Patent No. 613,984, dated November 8, 1898.

Application filed September 18, 1897. Serial No. 652,116. (No model.)

*To all whom it may concern:*

Be it known that we, ROBERT FRISKE and FRANK KASPAREK, citizens of the United States of America, residing at Irwin, in the county of Westmoreland and State of Pennsylvania, have invented certain new and useful Improvements in Plate-Glass-Polishing Machines, of which the following is a specification, reference being had therein to the accompanying drawings.

This invention relates to certain new and useful improvements in glass-polishing machines, and has for its object to construct a machine whereby both sides of a plate of glass are polished at one operation and the liability of breakage is reduced to a minimum.

The invention further aims to provide a device whereby any size plate of glass may be securely held in position during the operation of polishing.

With the above and other objects in view the invention finally consists in the novel construction, combination, and arrangement of parts, to be hereinafter more specifically described, and particularly pointed out in the claims.

In describing the invention in detail reference is had to the accompanying drawings, forming a part of this specification, and wherein like figures of reference indicate similar parts throughout the several views, in which—

Figure 6:
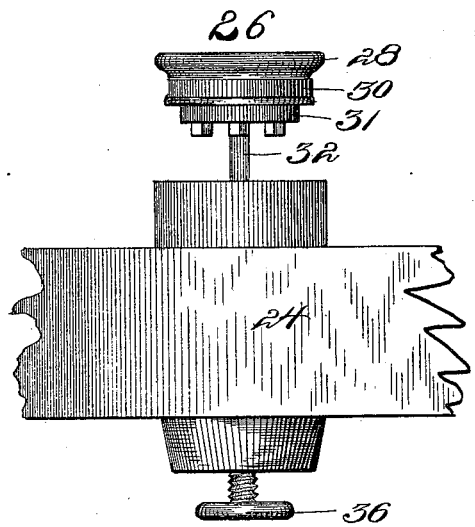
Figure 7:
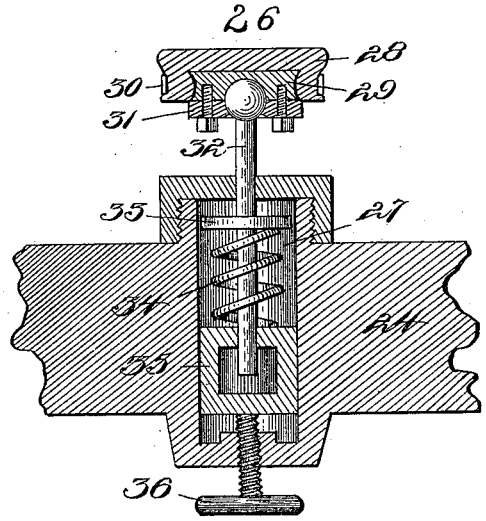
Figure 8:
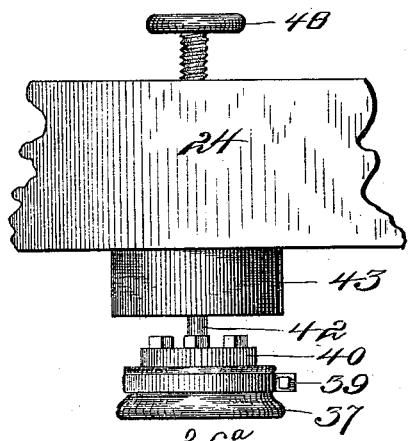
Figure 9:
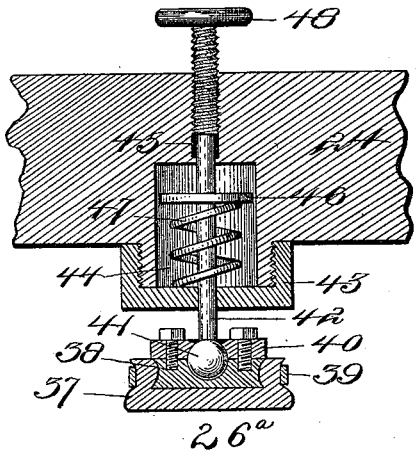

Figure 1 is a side elevation of our improved polisher with the plate-holding frame removed. Fig. 2 is an end elevation of the same with the plate-holding frame shown in dotted lines. Fig. 3 is a plan view of the plate-holding frame. Fig. 4 is a side elevation of one end of our improved polisher, showing the polishing-blocks in position. Fig. 5 is a bottom plan view showing gear connections for imparting motion to the polishing-blocks. Fig. 6 is a perspective view of one of the polishing-blocks secured to the stationary side of the frame. Fig. 7 is a sectional view of the same. Fig. 8 is a perspective view of one of the polishing-blocks secured to the movable side. Fig. 9 is a sectional view of the same. Fig. 10 is a perspective view of means for securing the movable and stationary frames together. Fig. 11 is an enlarged detail view of a portion of the frame shown in Fig. 3, showing means for securing the wood to the metal portion.

Referring now to the drawings, 1 designates a bed of brick or other suitable solid material, to which is secured a track 2, one portion of which is provided with teeth or cogs 3. To one end of said track are secured a stationary frame 4 and a movable frame 5. Mounted on the track 2 and pivotally secured at 6 to the movable frame 5 is a truck or wagon 7 having journaled therein suitable wheels 8, adapted to engage the track 2, and mounted on one end of the wagon is a frame 9, supporting two large gear-wheels 10 and two small gear-wheels 11, meshing with each other and one of said large gear-wheels engaging the teeth on the track 2, whereby the frame 5 is moved back and forth. Mounted on the outside frame of the wagon is a second frame 12, in which are journaled two large gear-wheels 13 and three small gear-wheels 14 and 14$^a$, meshing with the larger wheels and operated by a crank 15. The small wheel 14$^a$ has secured to the axle thereof a brace 16, engaging the supports 17, hinged to the movable frame 5 at 18. Said support 17 is provided on its underneath face with teeth 19, engaging the teeth of the gear-wheel 14$^a$. When the frame 5 is lowered, the ends of the supports 17 pass through the floor into opening 20. The stationary frame 4 and the movable frame 5 are constructed substantially the same, excepting the polishing-blocks, which will be described hereinafter. Each of said frames consists of a frame 21, having journaled therein a series of gear-wheels 22, meshing with each other. Secured to the end of the journal supporting said gear-wheels are crank-arms 23, engaging and operating a series of bars 24, carrying the polishing-blocks. Mounted on one of the shafts supporting the gear-wheels 22 is a pulley 25, to which power is applied to operate the polishing-blocks 26 and 26$^a$. The polishing-block 26 is secured in opening 27 of bars 24 of the stationary frame 4 and consists of the polishing material 28, secured to wooden head 29 by a spring-clamp 30. Secured to the head 29 is an iron plate 31, said wooden head and iron plate forming a ball-and-socket connection with the rod 32. Secured to the said rod 32 and located within the opening 27 is a collar 33, acting against a spiral spring 34. The lower end of the rod 32 enters an opening in a hollow square block 35, and pressing against the lower face of the block is a set-screw 36, said set-screw adjusting the tension of the spring 34, which holds the head of the polishing-block against the plate of glass.

The polishing-block shown in Figs. 8 and 9 is secured to the bars 24 of the movable frame and consists of a sheet of polishing material 37, secured to a block of wood 38 by means of a spring-band 39. Secured to the wooden block 38 is a plate of iron 40, said plate and block of wood forming a socket to receive a ball 41, forming a ball-and-socket joint. Said ball 41 is provided with a rod or extension 42, passing through the removable cap 43 and secured to the frame 24 through the space 44 and into the aperture 45. Secured to the rod 42 and located within the space 44 is a collar 46. Between said collar and the removable cap 43 is a spiral spring 47, said spring serving to hold the end of the rod 42 against the set-screw 48, said set-screw adjusting the pressure of the polishing-block against the plate of glass.

In Fig. 3 we have shown a frame for holding the glass plate during the operation of polishing, which consists of a frame 49 and a frame 50, fastened together with stay-irons 51. The frame 49 is provided with openings to receive set-screws 52, carrying on one end a milled head 53 and on the opposite end a thin metallic plate 54. Secured to the edge of said plate by means of screws 55$^a$ (shown in dotted lines) is a strip of wood 55, to which is glued a strip of rubber or other suitable soft material 56. Said wood and rubber form a firm gripping-surface and prevents the edge of the plate of glass from coming in contact with the iron. Said frame so constructed is secured to the supports 57 of the movable frame 5 in any convenient manner and occupies a position between the movable frame and stationary frame, as shown in Fig. 4.

In Fig. 10 we have shown means for locking the movable and stationary frames together, which consists of hinging the arms 61 to the stationary frame 4, as shown at 62, by the mutual hinge-axis 64. Secured to the movable frame 5 in any suitable manner are angle-braces 63. Rotatably secured to the end of the arms 61 are arms 65, carrying a bolt 66, which passes through an opening formed in the end of the arm 61, which conforms to the size of the bolt, and through an opening 67$^a$, formed in the end of the angle-braces 63, said opening conforming to the size and shape of the head 67, formed on the inner end of the bolt 66. Secured to the arm 65 is a rod 68, which is provided with a handle 69, so that when the frames 4 and 5 are to be unlocked the rod 68 is moved to a position when the heads 67 of the bolts 66 registers with the openings 67$^a$ in the angle-iron 63, when the head-bolt will pass through the opening 67$^a$. By this construction the entire number of arms 65 are operated simultaneously by the rod 68.

Secured to the supports 57 are bearing-rods 70, passing through openings formed in the ends of rods 24. The object of said rod 70 is to prevent the lateral motion of the rods 24 and causes said rods to move in the same frame.

The operation is as follows: In order to take a plate out of the machine which has been polished and replace it by a new one, the lock has to be opened, which is done by operating the lever 69 either to the right or left, as the case may be, when the angle-irons 61 can be raised. The brake is applied to prevent the frame 5 from descending too fast, and when it is in the desired position it is securely fastened. The set-screws 52 are then loosened and the finished plate is removed and a new plate is inserted to be polished, when the frame 5 is raised to a perpendicular position, and by means of the gear-wheels 10 and 11 the wagon moves the frame 5 in close proximity to the stationary frame 4. When power is applied, the polishing-heads are caused to move in a circle, and by this motion a smooth polished surface is given to the glass.

It will be noted that various changes may be made in the details of construction without departing from the general spirit of our invention.

Having fully described our invention, what we claim as new, and desire to secure by Letters Patent, is—

1. In a glass-polishing machine, the combination of a stationary frame, and a movable frame, parallel tracks secured to a suitable base, a wagon operating on said tracks and being pivotally secured to the movable frame, whereby said frame is moved toward or away from the stationary frame, substantially as shown and described.

2. In a glass-polishing machine, the combination of a stationary frame and a movable frame, means for operating the movable frame, a frame secured to the movable frame for holding the glass plate to be polished, and means for polishing said plate, substantially as shown and described.

3. In combination, a stationary frame and a movable frame a plate-holding frame secured to the movable frame, provided with set-screws to be adjusted to hold different-sized plates, and means carried by said stationary and movable frames whereby both sides of the glass plate are polished at the same time, substantially as shown and described.

4. In combination, a stationary and a movable frame, a plate-holding frame secured to the movable frame, rotating polishing-blocks mounted in the said stationary and movable frames, and means for operating said blocks, substantially as shown and described.

5. In a glass-polishing machine, the combination of a stationary frame, parallel tracks secured to a suitable base, a wagon operating on said tracks and carrying the movable frame, a stay pivoted to the movable frame and engaging operating means carried by the wagon whereby said frame is lowered to a horizontal position and means for moving the movable frame toward or away from the stationary frame, substantially as shown and described.

6. In a glass-polishing machine, the combination of a stationary frame and a movable frame, a wagon for moving the movable frame to regulate the distance between the same and the stationary frame, means pivoted to the movable frame whereby the same is lowered to a horizontal position, a frame secured to the movable frame for holding the glass plate, and rotary polishing-blocks carried by the movable and stationary frame, substantially as shown and described.

7. In a glass-polishing machine, the combination of a stationary frame and a movable frame, a series of parallel bars mounted on crank-arm secured to journals secured in said frames, said journals carrying gear-wheels meshing with each other, each alternate parallel bars moving in the same direction, the remaining bars moving in the opposite direction, and polishing-blocks carried by said frames, whereby both sides of the glass are polished at one operation substantially as shown and described.

In testimony whereof we affix our signatures in presence of two witnesses.

ROBERT FRISKE.
FRANK KASPAREK.

Witnesses:
JOHN NOLAND,
THOS. M. BOYD, Jr.